US009258849B2

(12) United States Patent
Kato et al.

(10) Patent No.: US 9,258,849 B2
(45) Date of Patent: Feb. 9, 2016

(54) FABRIC MATERIAL

(75) Inventors: Kouhei Kato, Chiryu (JP); Akari Takahashi, Kasugai (JP); Takahiro Harita, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 649 days.

(21) Appl. No.: 13/097,642

(22) Filed: Apr. 29, 2011

(65) Prior Publication Data

US 2011/0278282 A1 Nov. 17, 2011

(30) Foreign Application Priority Data

May 14, 2010 (JP) ................................ 2010-111925

(51) Int. Cl.

| | |
|---|---|
| ***H05B 3/34*** | (2006.01) |
| ***H05B 3/54*** | (2006.01) |
| ***B60L 1/02*** | (2006.01) |
| ***H05B 1/00*** | (2006.01) |
| ***H05B 3/00*** | (2006.01) |
| ***H05B 11/00*** | (2006.01) |
| ***A47C 7/72*** | (2006.01) |
| ***A47C 31/00*** | (2006.01) |

(52) U.S. Cl.
CPC .......... *H05B 3/342* (2013.01); *H05B 2203/005* (2013.01); *H05B 2203/011* (2013.01); *H05B 2203/014* (2013.01); *H05B 2203/015* (2013.01); *H05B 2203/016* (2013.01)

(58) Field of Classification Search
CPC ............. H05B 3/342; H05B 2203/005; H05B 2203/011; H05B 2203/014; H05B 2203/015; H05B 2203/016
USPC ......... 219/201, 212, 217, 494, 528, 529, 550, 219/202; 297/180.12, 217.3; 174/121 R, 174/122 R, 124 R, 126.2
See application file for complete search history.

(56) References Cited

U.S. PATENT DOCUMENTS

| | | | | |
|---|---|---|---|---|
| 4,575,617 A * | 3/1986 | Cooper | ......................... | 219/494 |
| 5,151,577 A * | 9/1992 | Aspden | ......................... | 219/528 |
| 5,236,765 A * | 8/1993 | Cordia et al. | ................ | 428/192 |

(Continued)

FOREIGN PATENT DOCUMENTS

| | | |
|---|---|---|
| CN | 101039538 | 9/2007 |
| CN | 201136018 | 10/2008 |

(Continued)

OTHER PUBLICATIONS

U.S. Appl. No. 13/111,145 to Hideaki Kunisada et al., which was filed on May 19, 2011.

(Continued)

*Primary Examiner* — Dana Ross
*Assistant Examiner* — Lindsey C Teaters
(74) *Attorney, Agent, or Firm* — Greenblum & Bernstein, P.L.C.

(57) ABSTRACT

A fabric material includes a conductive wire material that generates heat when supplied with current. Part of the conductive wire material in a longitudinal direction of the conductive wire material is externally exposed from the fabric material. A first planar element and a second planar element, of which at least one has electrical conductivity, are electrically connected to an externally exposed portion of the conductive wire material in such a manner that the first and second planar elements sandwich the exposed portion and are bonded so as to be in planar contact with each other.

8 Claims, 7 Drawing Sheets

(56) References Cited

U.S. PATENT DOCUMENTS

| | | | | |
|---|---|---|---|---|
| 5,313,034 | A * | 5/1994 | Grimm et al. | 219/765 |
| 6,172,344 | B1 * | 1/2001 | Gordon et al. | 219/529 |
| 2007/0210074 | A1 * | 9/2007 | Maurer et al. | 219/549 |
| 2009/0095735 | A1 * | 4/2009 | Resheff | 219/549 |
| 2009/0302648 | A1 | 12/2009 | Kato et al. | |
| 2010/0096899 | A1 | 4/2010 | Kato et al. | |
| 2010/0101858 | A1 | 4/2010 | Kato et al. | |
| 2010/0258334 | A1 | 10/2010 | Akaike et al. | |

FOREIGN PATENT DOCUMENTS

| | | |
|---|---|---|
| JP | 2001-023761 | 1/2001 |
| JP | 3119584 | 2/2006 |
| JP | 2006-108055 | 4/2006 |
| JP | 2007-227384 | 9/2007 |
| JP | 2009-513201 | 4/2009 |
| JP | 2009-283426 | 12/2009 |
| WO | 2007/048520 | 5/2007 |

OTHER PUBLICATIONS

U.S. Appl. No. 13/107,343 to Fumitoshi Akaike et al., which was filed on May 13, 2011.

China Office action, dated Feb. 1, 2013 along with an english translation thereof.

* cited by examiner

FABRIC MATERIAL

INCORPORATION BY REFERENCE

The disclosure of Japanese Patent Application No. 2010-111925 filed on May 14, 2010 including the specification, drawings and abstract is incorporated herein by reference in its entirety.

BACKGROUND OF THE INVENTION

1. Field of the Invention

The invention relates to a fabric material. More particularly, the invention relates to a fabric material that includes a conductive wire material that is able to generate heat when supplied with current.

2. Description of Related Art

There is known means for heating a seated surface of a vehicle seat, in which conductive threads (conductive wire materials) that are able to generate heat when supplied with current are braided in a skin material (fabric material) formed of a woven fabric (Japanese Patent Application Publication No. 2007-227384 (JP-A-2007-227384)). Each conductive thread is braided in the skin material in the seat width direction, and the plurality of conductive threads are arranged in the seat front-rear direction to thereby make it possible to heat the seated surface over a wide region. The conductive threads are electrically connected to one another by a conductive planar element that is connected over these conductive threads. The conductive threads are supplied with current by the planar element to generate heat.

However, in the above technique, when the planar element is electrically connected to the conductive threads in the fabric material by thermal welding, the planar element may not be welded to the conductive threads so as to be electrically connected to the conductive threads depending on the compatibility between the planar element and nonconductive threads that are principal components of the fabric material.

SUMMARY OF THE INVENTION

The invention makes it possible to electrically connect a conductive wire material of a fabric material to a conductive planar element with a small connection resistance between the conductive wire material and the planar element.

An aspect of the invention provides a fabric material. The fabric material includes: a conductive wire material that generates heat when supplied with current; and first and second planar elements of which at least one has electrical conductivity. Part of the conductive wire material in a longitudinal direction of the conductive wire material is externally exposed from the fabric material. The first and second planar elements are electrically connected to an externally exposed portion of the conductive wire material in such a manner that the first and second planar elements sandwich the exposed portion and are bonded so as to be in planar contact with each other.

According to the above aspect, two planar elements are bonded so as to be in planar contact with each other, so wide bonding surfaces are respectively ensured for both planar elements to thereby easily stabilize the bonding state of the two planar elements. Thus, the two planar elements are bonded to each other so as to sandwich the exposed portion of the conductive wire material. By so doing, the conductive wire material may be electrically connected to the planar elements with a small connection resistance therebetween.

In the above aspect, a plurality of the conductive wire materials may be arranged in a specific in-plane direction of the fabric material, and the first and second planar elements may be provided over the exposed portions of the respective conductive wire materials.

With the above configuration, the two planar elements are electrically connected to the exposed portions of the plurality of conductive wire materials in such a manner that the two planar elements sandwich the exposed portions and are bonded so as to be in planar contact with each other. By so doing, it is possible to electrically connect the plurality of conductive wire materials to the first and second planar elements with a small connection resistance therebetween.

In the above aspect, the first and second planar elements may be formed of cloths made of the same materials that are bonded to each other by thermal welding.

With the above configuration, the two planar elements may be melted in the same melting mode to be bonded to each other in a favorable state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

Figure 1:
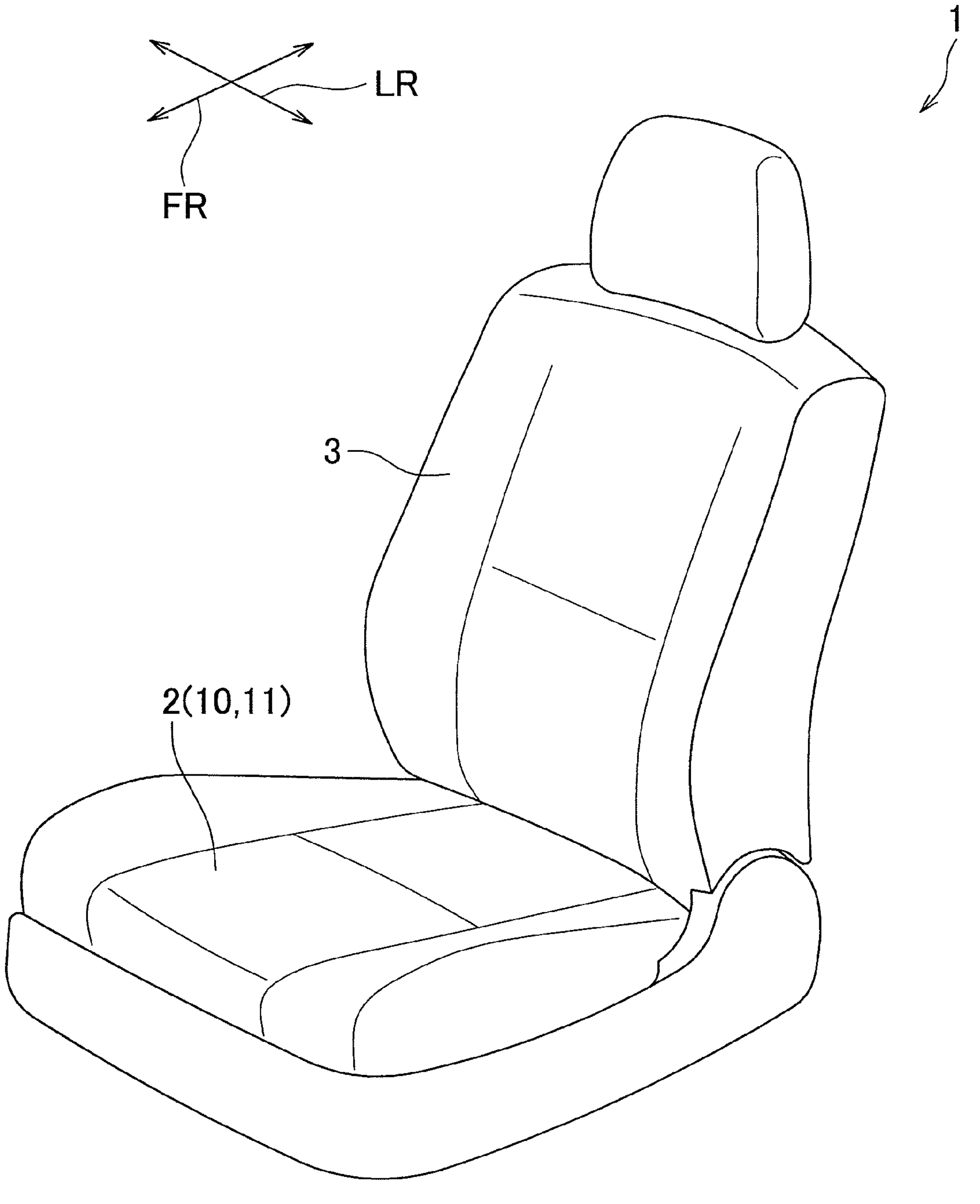
FIG. 1 is a perspective view of a vehicle seat to which a fabric material according to a first embodiment is applied.
Figure 2:
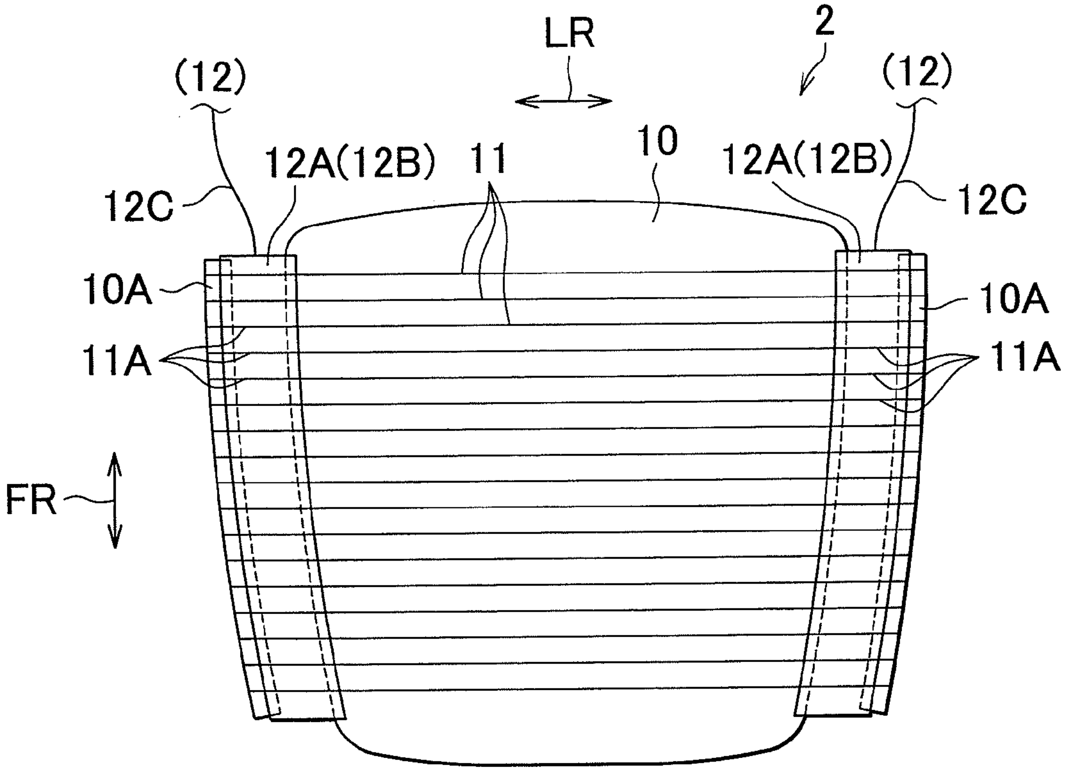
FIG. 2 is a partially see-through plan view of the fabric material.

First, the configuration of a fabric material 10 according to a first embodiment will be described with reference to FIG. 1 to FIG. 5B. As shown in FIG. 1 and FIG. 2, the fabric material 10 according to the present embodiment is formed as a skin material that constitutes the seated surface of a seat cushion 2 of a vehicle seat 1. The fabric material 10 embeds therein a plurality of conductive wire materials 11 that are able to generate heat when supplied with current. Each conductive wire material 11 is supplied with current to generate heat to thereby cause the fabric material 10 to function as a heater.

As shown in FIG. 2, the plurality of conductive wire materials 11 extending in a seat width direction LR are provided inside the fabric material 10 so as to be arranged in a seat front-rear direction FR. These conductive wire materials 11 are formed by twisting a plurality of carbon fiber filaments (conductive threads) into a bundle. Note that, other than the above, the conductive wire materials 11 may be formed of conductive threads made of metal or alloy or may be formed of plated wire materials or may be formed of a plurality of any one of these wire materials, twisted into a bundle.

The fabric material 10 is a cloth formed by weaving polyethylene terephthalate (PET) false twisted yarn. Note that, other than the above, the fabric material 10 may be formed of a woven fabric, a knit fabric, a nonwoven fabric and a braided rope (braid) manufactured from wire materials made of various insulating fibers. The material of the insulating fiber may be a plant or animal natural fiber, a chemical fiber made of thermoplastic resin or thermosetting resin, or a blended fiber of them.

The conductive wire materials 11 are woven at a predetermined interval when the fabric material 10 is manufactured. By so doing, the conductive wire materials 11 are embedded inside the fabric material 10. Note that the conductive wire materials 11 may be stuck to the back surface of the fabric material 10 instead. A pad material and a back base fabric (not shown) are provided at the back surface of the fabric material 10. Conductive means 12 is electrically connected to the conductive wire materials 11. The fabric material 10 functions as a heater in such a manner that the conductive means 12 is used to supply current to the conductive wire materials 11 to thereby generate heat. At this time, it is desirable to electrically connect the conductive wire materials 11 to the conductive means 12 with a small connection resistance between the conductive wire materials 11 and the conductive means 12.

Figure 3A:
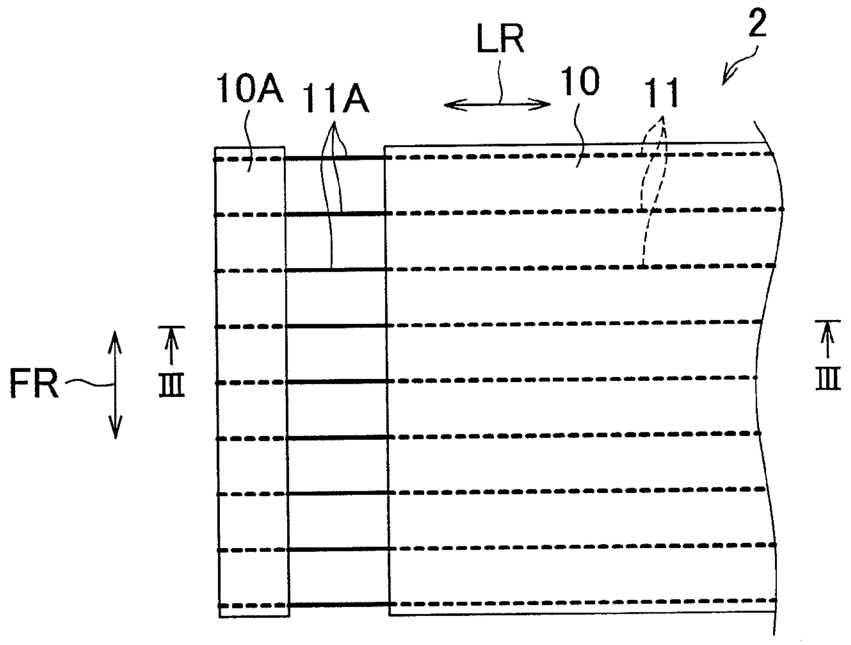
FIG. 3A is a partially enlarged view that shows a manufacturing process of the fabric material.
Figure 3B:
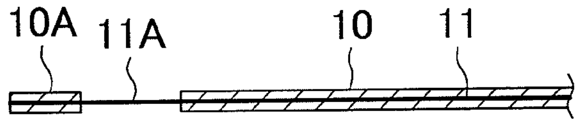
FIG. 3B is a cross-sectional view that is taken along the line in FIG. 3A.
Figure 4A:
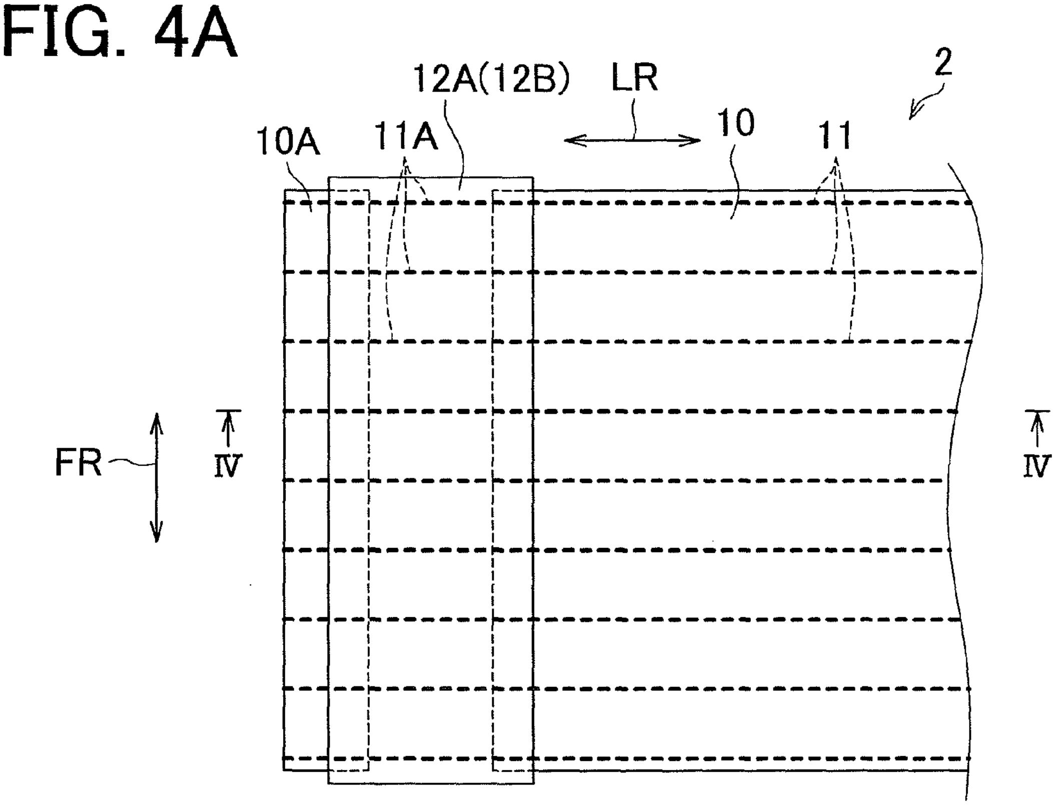
FIG. 4A is a partially enlarged view that shows another manufacturing process of the fabric material.
Figure 4B:
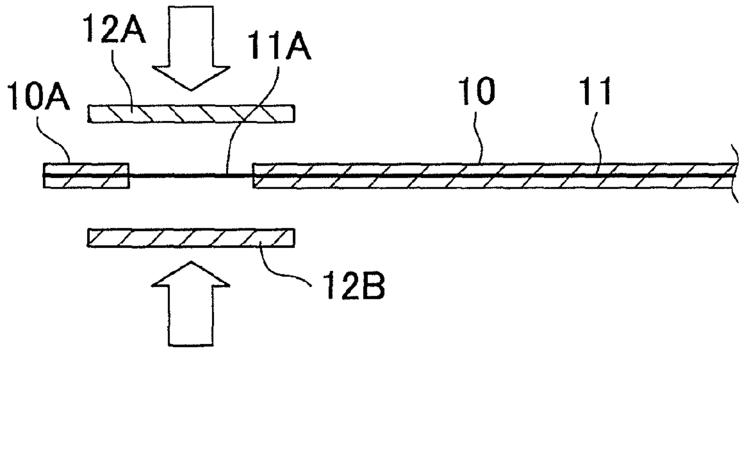
FIG. 4B is a cross-sectional view that is taken along the line IV-IV in FIG. 4A.

Hereinafter, the configuration that the conductive wire materials 11 are electrically connected to the conductive means 12 with a small connection resistance therebetween will be described in detail. Here, as shown in FIG. 2 to FIG. 3B, a surface portion of the fabric material 10 between the body portion and each edge portion 10A is thermally melted and removed by laser irradiation, and parts (exposed portions 11A) of the conductive wire materials 11 are externally exposed. Note that means for removing part of the fabric material 10 may be not only optical heating means, such as the laser, but also mechanical removing means, such as a punch and a pair of scissors.

Then, as shown in FIG. 3A to FIG. 5B, a belt-like conductive first planar element 12A and a belt-like conductive second planar element 12B are provided to sandwich the exposed portions 11A of the conductive wire materials 11 at each of right and left sides from both upper and lower sides over all the exposed portions 11A, and then these are thermally welded to be integrated with each other. By so doing, the first planar element 12A and the second planar element 12B are electrically connected to the conductive wire materials 11. Here, each first planar element 12A and each second planar element 12B respectively serve as planar elements according to the aspect of the invention.

The first and second planar elements 12A and 12B each are formed so that a plurality of conductive threads having electrical conductivity are woven in a cloth woven from polyethylene terephthalate (PET) false twisted yarn as in the case of the fabric material 10. Note that, other than the above, the first and second planar elements 12A and 12B each may be formed so that a plurality of conductive threads are embedded in a woven fabric, a knit fabric, a nonwoven fabric and a braided rope (braid) manufactured from wire materials made of various insulating fibers. Each pair of first planar element 12A and second planar element 12B are set so as to sandwich the exposed portions 11A of the conductive wire materials 11 from both upper and lower sides. Then, these are melted by various heating means to bring the conductive threads into contact with the exposed portions 11A of the conductive wire materials 11. Thus, the entire facing surfaces of the first and second planar elements 12A and 12B are welded to each other. That is, each pair of first planar element 12A and second planar elements 12B are electrically connected to the exposed portions 11A, and are integrally bonded to each other.

Figure 5A:
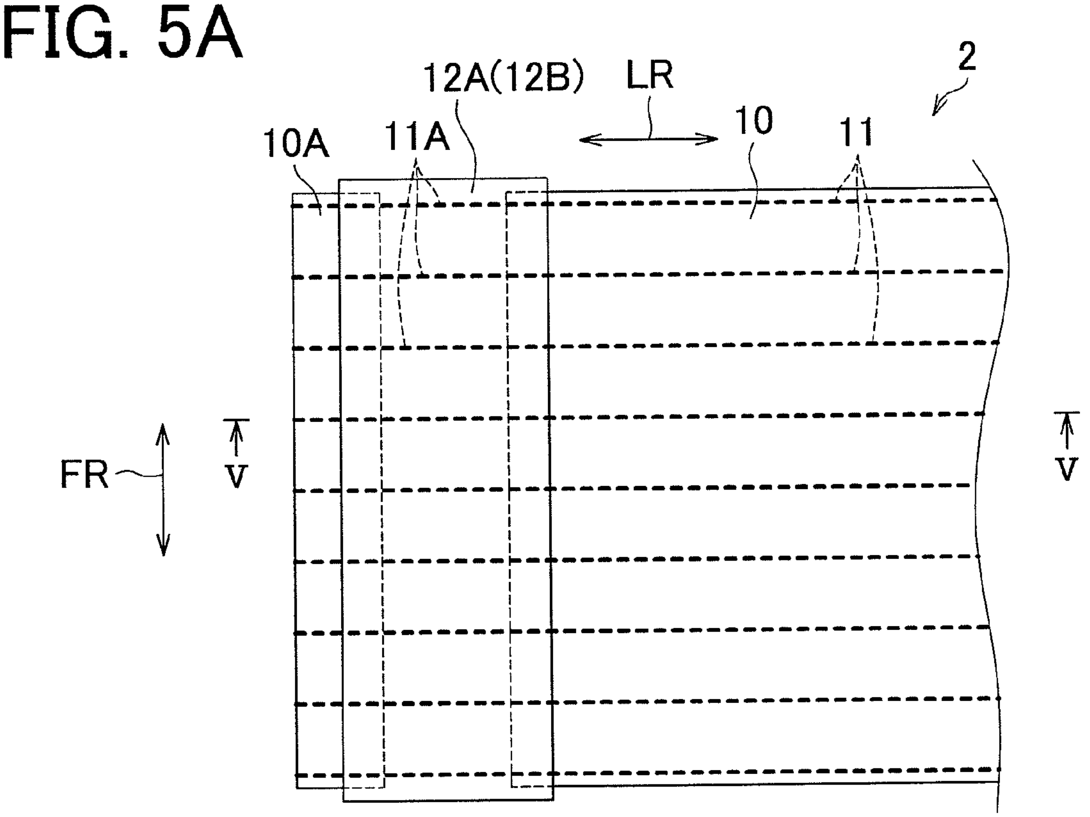
FIG. 5A is a partially enlarged view of the manufactured fabric material.
Figure 5B:
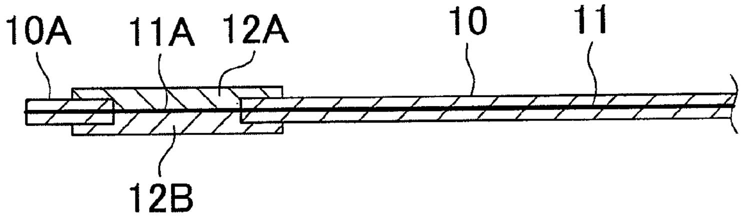
FIG. 5B is a cross-sectional view that is taken along the line V-V in FIG. 5A.
Figure 6A:
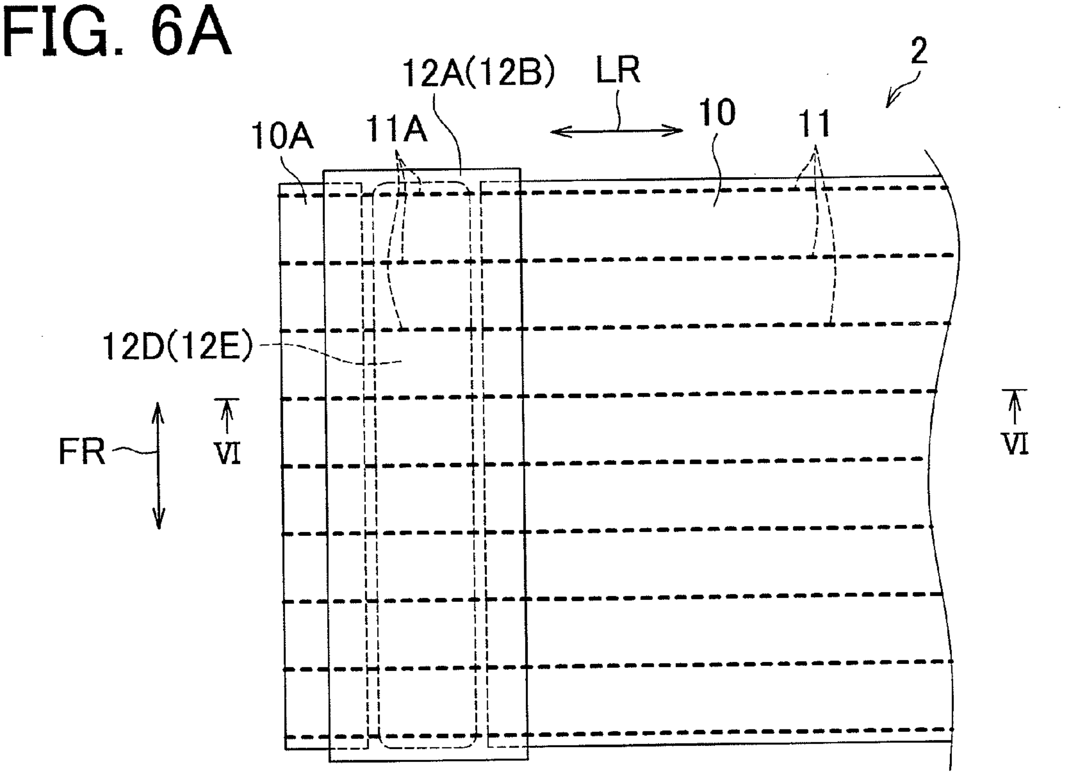
FIG. 6A is a partially enlarged view that shows a manufacturing process of a fabric material according to a second embodiment.
Figure 6B:
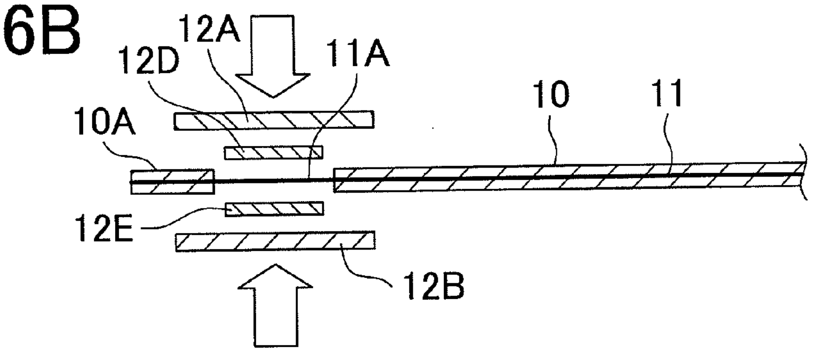
FIG. 6B is a cross-sectional view that is taken along the line VI-VI in FIG. 6A.
Figure 7A:
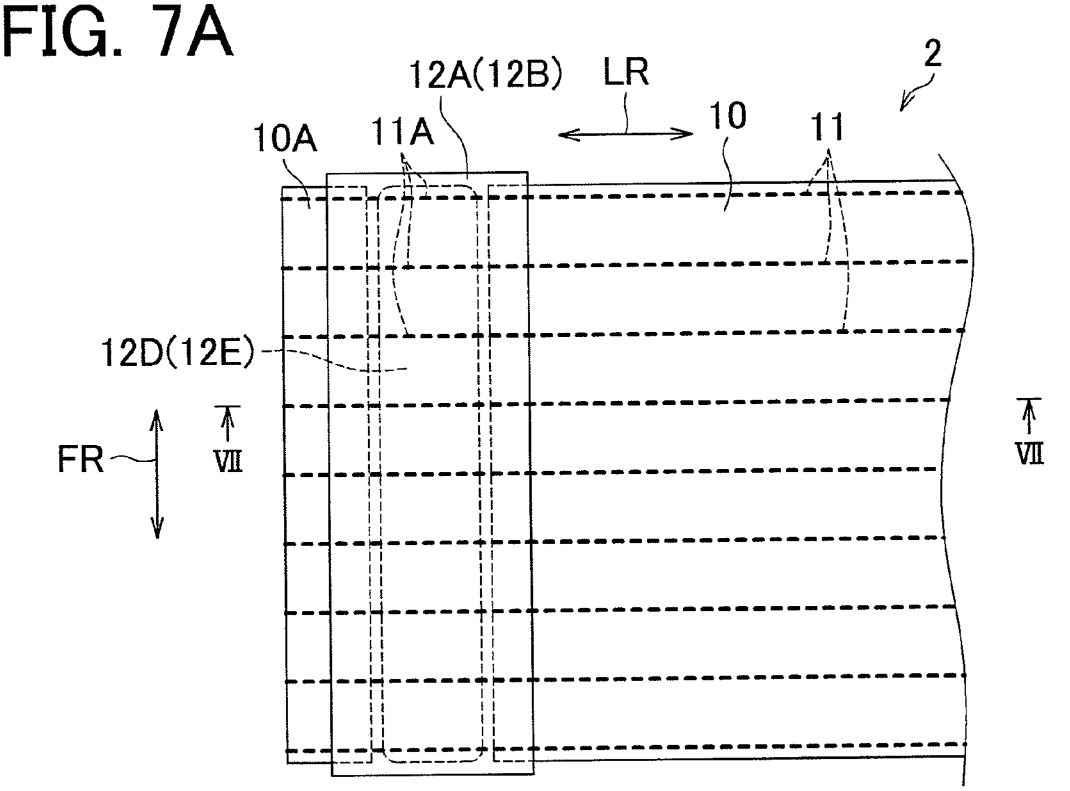
FIG. 7A is a partially enlarged view of the manufactured fabric material.
Figure 7B:
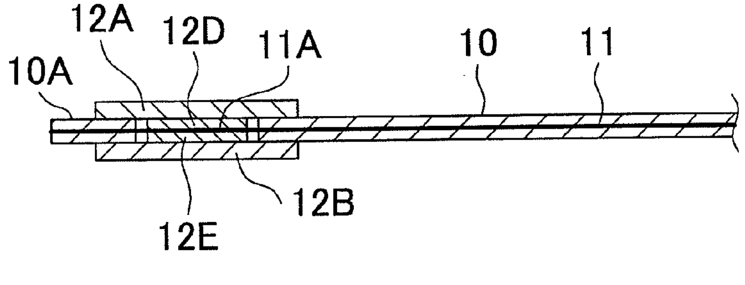
FIG. 7B is a cross-sectional view that is taken along the line VII-VII in FIG. 7A.

More specifically, as shown in FIG. 5A and FIG. 5B, both right and left edge portions of each of the first and second planar elements 12A and 12B are placed on the body portion and edge portion 10A of the fabric material 10 and are fixedly welded to the body portion and the edge portion 10A. By so doing, the first and second planar elements 12A and 12B each are also fixed to the fabric material 10 and are maintained in a state where the first and second planar elements 12A and 12B are electrically further stably connected to the exposed portions 11A of the conductive wire materials 11. As shown in FIG. 2, power cables 12C are respectively electrically connected to the right and left side first planar elements 12A that are respectively arranged between the body portion and right edge portion 10A of the fabric material 10 and between the body portion and left edge portion 10A of the fabric material 10. These power cables 12C each are electrically connected to the positive electrode or negative electrode of a direct-current power supply (not shown). The conductive wire materials 11 are electrically connected to the power cables 12C so as to constitute a parallel circuit in which the conductive wire materials 11 are arranged in parallel with the direct-current power supply. By so doing, the conductive wire materials 11 are supplied with current at a relatively low voltage to thereby generate heat.

In this way, with the fabric material 10 according to the present embodiment, each pair of first and second planar elements 12A and 12B that are electrically connected to the exposed portions 11A of the conductive wire materials 11 are bonded so as to be in planar contact with each other. Therefore, wide bonding surfaces are respectively ensured for the first and second planar elements 12A and 12B to thereby easily stabilize the bonding state of the first and second planar elements 12A and 12B. Thus, each pair of first planar element 12A and second planar element 12B are bonded to each other so as to sandwich the exposed portions 11A of the conductive wire materials 11. By so doing, the conductive wire materials 11 may be electrically connected to the first and second planar elements 12A and 12B with a small connection resistance therebetween. In addition, each pair of first planar element 12A and second planar element 12B are formed of cloths made of the same materials that may be bonded to each other by thermal welding. By so doing, each pair of first planar element 12A and second planar element 12B may be melted in the same melting mode to be bonded to each other in a favorable state.

Subsequently, the configuration of a fabric material 10 according to a second embodiment will be described with reference to FIG. 6A to FIG. 7B. Note that, in the present embodiment, like reference numerals denote portions having substantially similar configurations to those of the fabric material 10 described in the first embodiment and the description thereof is omitted, and then different reference numerals denote portions having different configurations from those of the fabric material 10 described in the first embodiment, and the description of the different portions will be described in detail.

As shown in FIG. 6A to FIG. 7B, the fabric material 10 according to the present embodiment is formed so that a belt-like conductive first intermediate member 12D and a belt-like conductive second intermediate member 12E are provided between the first planar element 12A and the second planar element 12B so as to sandwich the exposed portions 11A of the conductive wire materials 11 from both upper and lower sides. These first intermediate member 12D and second intermediate member 12E are formed to have a width that falls within the width of a gap through which the exposed portions 11A between the body portion and edge portion 10A of the fabric material 10 are exposed. That is, the width of each of the first intermediate member 12D and the second intermediate member 12E is smaller than the length of each exposed portion 11A. The first intermediate member 12D and the second intermediate member 12E are arranged so as to be sandwiched between the first planar element 12A and the second planar element 12B. By so doing, the first intermediate member 12D and the second intermediate member 12E function so as to bring the first planar element 12A and the second planar element 12B into planer contact without warpage corresponding to the thickness of the fabric material 10. Thus, these first intermediate member 12D and second intermediate member 12E each are formed of a material having elastic force. By so doing, pressure bonding force exerted on the exposed portions 11A and the pressure bonding forces exerted on the first and second planar elements 12A and 12B are increased to thereby make it possible to electrically connect the conductive wire materials 11 to the first and second planar elements 12A and 12B with a further small connection resistance therebetween. Note that at least one of the first intermediate member 12D and the second intermediate member 12E just needs to have elastic force; however, it is desirable that both the first intermediate member 12D and the second intermediate member 12E have the elastic force because it is possible to exhibit further strong elastic force. Note that, in the present embodiment, both the first intermediate members 12D and the second intermediate members 12E have electrical conductivity, so the power cables 12C (see FIG. 2) may be electrically connected to the first planar elements 12A as in the case of the first embodiment; alternatively, the power cables 12C may be connected to the first intermediate members 12D or the second intermediate members 12E.

The aspect of the invention is described using the two embodiments; however, the aspect of the invention may be implemented in various forms other than the above embodiments. In the above embodiments, the fabric material 10 is used as the skin material of the seat cushion 2 of the vehicle seat 1. Instead, the fabric material 10 may be used as a skin material of a portion with which a seated occupant contacts, such as a seat back 3, a headrest and an ottoman. In addition, the fabric material according to the aspect of the invention is not limited to application of a skin material of a vehicle seat; instead, it may be applied to various fabric materials that are used to give heat sensation to a user. In addition, the number of conductive wire materials provided for a fabric material at least needs to be one and the number of conductive wire materials is not specifically limited. In addition, the conductive wire materials just need to be externally exposed from the fabric material partially in the longitudinal direction; a direction in which the conductive wire materials are oriented with respect to the fabric material and a portion at which the exposed portions are externally exposed are not specifically limited, and may be freely set in accordance with the purpose of use.

In addition, in the above embodiments, the first and second planar elements 12A and 12B each have electrical conductivity; instead, at least one of the pair of planar elements, connected to the power cable 12C, needs to have electrical conductivity. In addition, similarly in the second embodiment, the first and second intermediate member 12D and 12E each have electrical conductivity; instead, at least one of the pair of intermediate members, which contact the one of the pair of planar elements connected to the power cable 12C, needs to have electrical conductivity. In addition, in the second embodiment, the pair of belt-like first intermediate member 12D and second intermediate members 12E are arranged so as to sandwich the exposed portions 11A of the conductive wire materials 11; however, the shapes of them are not limited to a belt-like shape. The pair of first and second intermediate members 12D and 12E may be formed in another shape, like conductive wire material. In addition, the pair of first planar element 12A and second planar element 12B are formed of cloths made of the same material that can be bonded to each other by thermal welding. Instead, the pair of first planar element 12A and second planar element 12B may be formed of different materials. Furthermore, the member having electrical conductivity may be conductive overall or may be partially conductive.

What is claimed is:

1. A fabric material comprising:

a conductive wire material embedded inside the fabric material that generates heat when supplied with current, wherein a portion of the conductive wire material in a longitudinal direction of the conductive wire material is externally exposed from the fabric material; and first and second planar elements of which at least one has electrical conductivity, wherein the first and second planar elements are made of cloths and are electrically connected to the externally exposed portion of the conductive wire material in such a manner that the first and second planar elements sandwich the exposed portion of the conductive wire material therebetween, and portions of the first and second planar elements are directly bonded with each other.

2. The fabric material according to claim 1, wherein the conductive wire material is a plurality of conductive wire materials arranged in a specific in-plane direction of the fabric material, and the first and second planar elements are provided over exposed portions of the respective conductive wire materials.

3. The fabric material according to claim 1, wherein the first and second planar elements are cloths made of the same materials that are bonded to each other by thermal welding.

4. The fabric material according to claim 1, further comprising:

first and second intermediate members of which at least one has electrical conductivity, wherein the first and second intermediate members are provided between the first and second planar elements so as to sandwich the exposed portion of the conductive wire material, and the at least one of the first and second intermediate members, having electrical conductivity, is provided between the at least one of the first and second planar elements, having electrical conductivity, and the exposed portion of the conductive wire material.

5. The fabric material according to claim 4, wherein a width of one of the first and second intermediate members is smaller than a length of the exposed portion of the conductive wire material.

6. The fabric material according to claim 4, wherein at least one of the first and second intermediate members has elastic force.

7. The fabric material according to claim 1, further comprising:

first and second intermediate members of which at least one has electrical conductivity, wherein the first and second intermediate are provided within a gap in the fabric material defined where the conductive wire material is externally exposed from the fabric material so as to sandwich the exposed portion of the conductive wire material therebetween, and wherein the first and second intermediate members are provided between the first and second planar elements.

8. A fabric material, comprising:

a conductive wire material configured to generate heat when supplied with a current, the conductive wire material having an exposed portion disposed between portions embedded inside the fabric material; and first and second planar elements of which at least one has electrical conductivity, wherein the first planar element is bonded with the second planar element with the exposed portion of the conductive wire material disposed therebetween, and the first and second planar elements are made of cloths.

* * * * *